(No Model.) 12 Sheets—Sheet 1.

J. HARTNESS.
MACHINE FOR MAKING SCREWS.

No. 457,967. Patented Aug. 18, 1891.

WITNESSES:
W. D. Woodson
C. G. Richardson

INVENTOR:
James Hartness

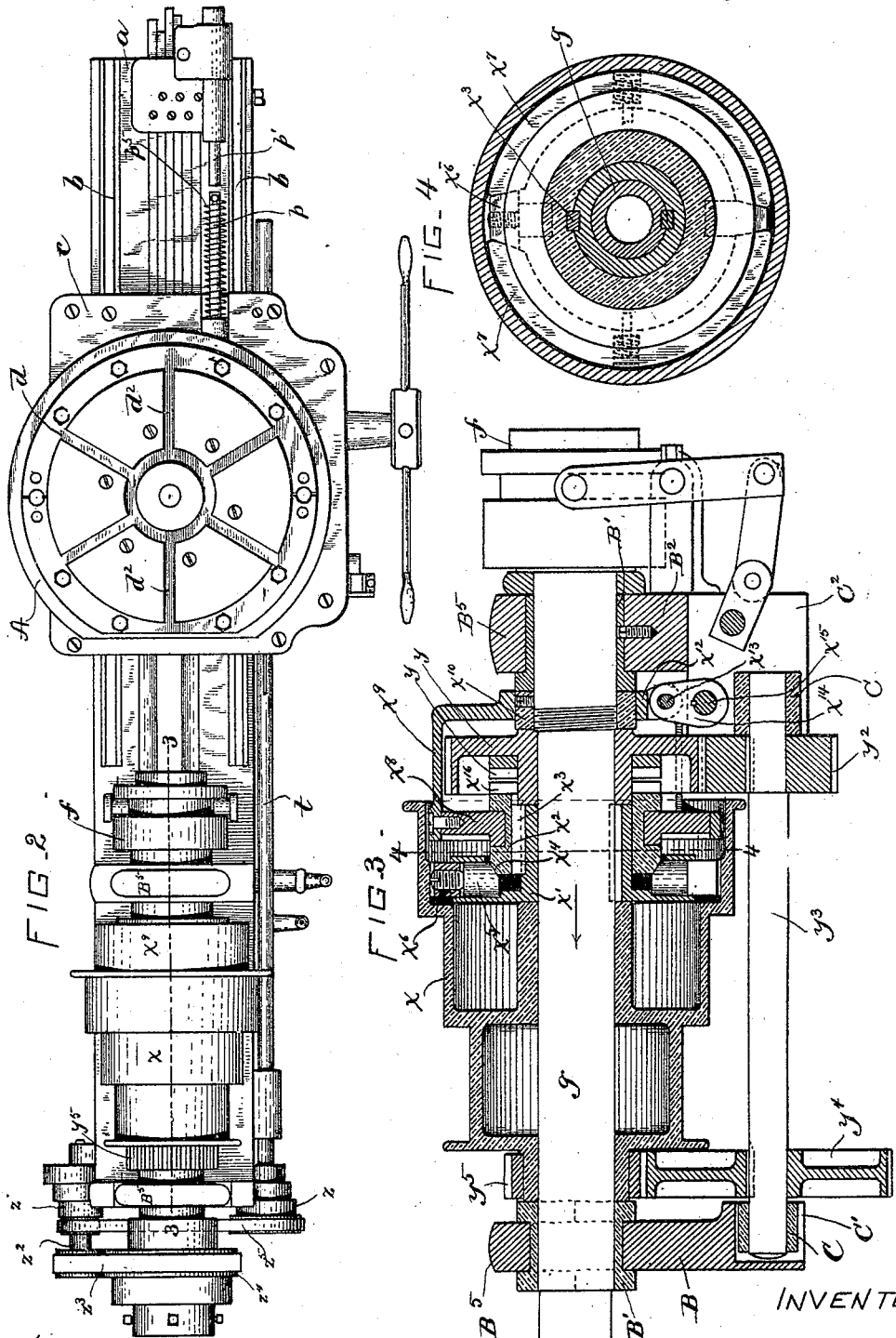

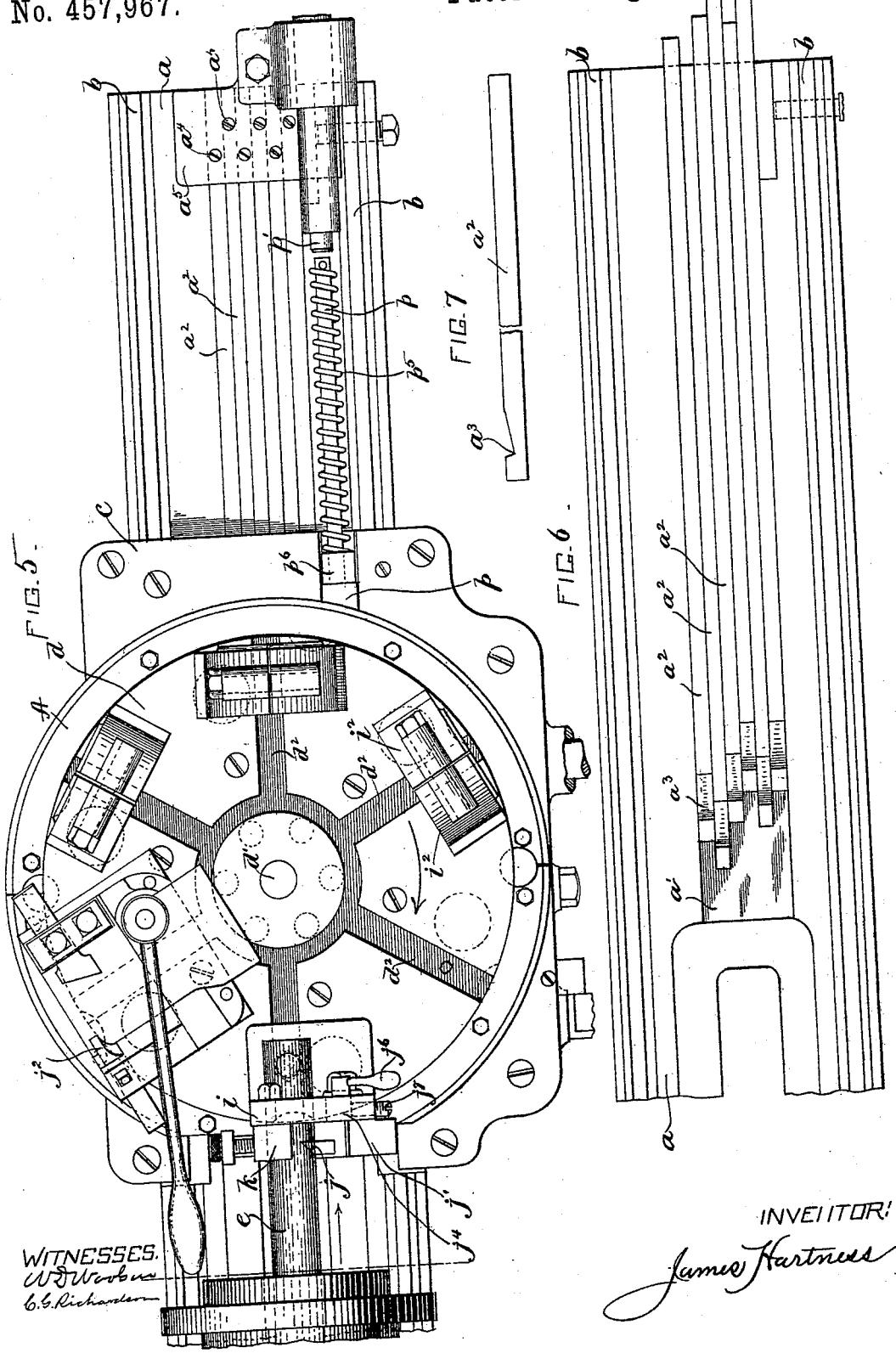

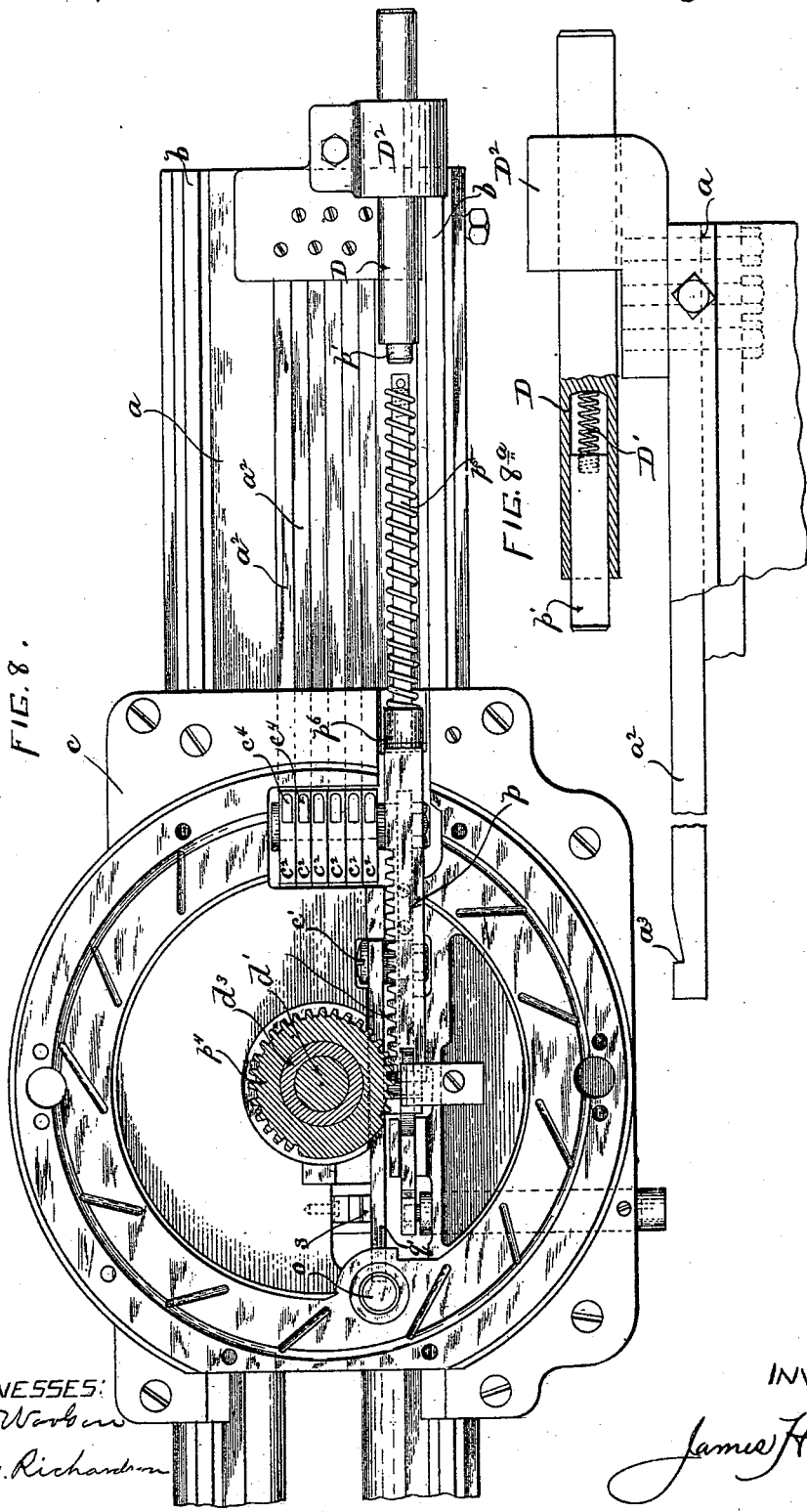

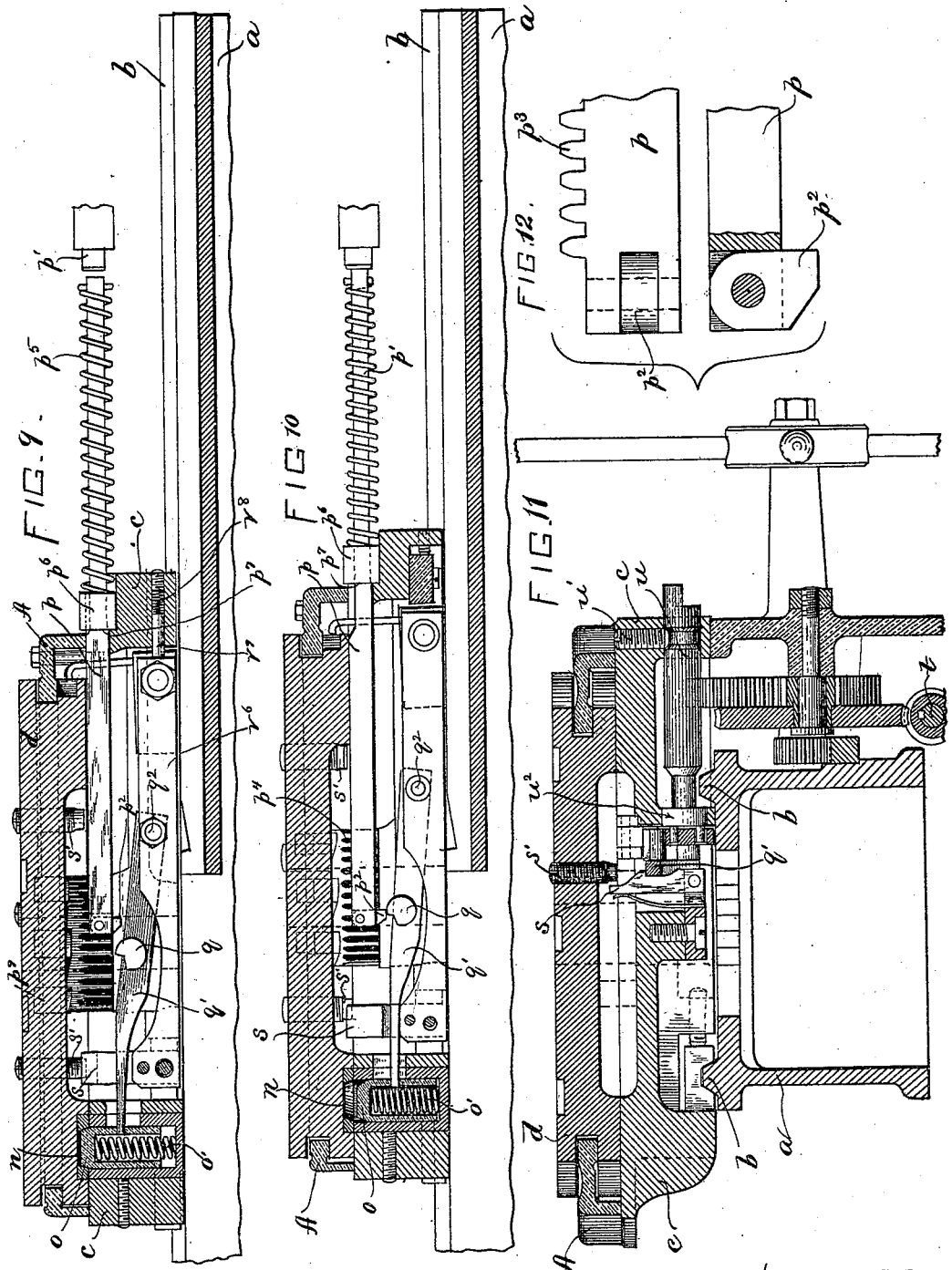

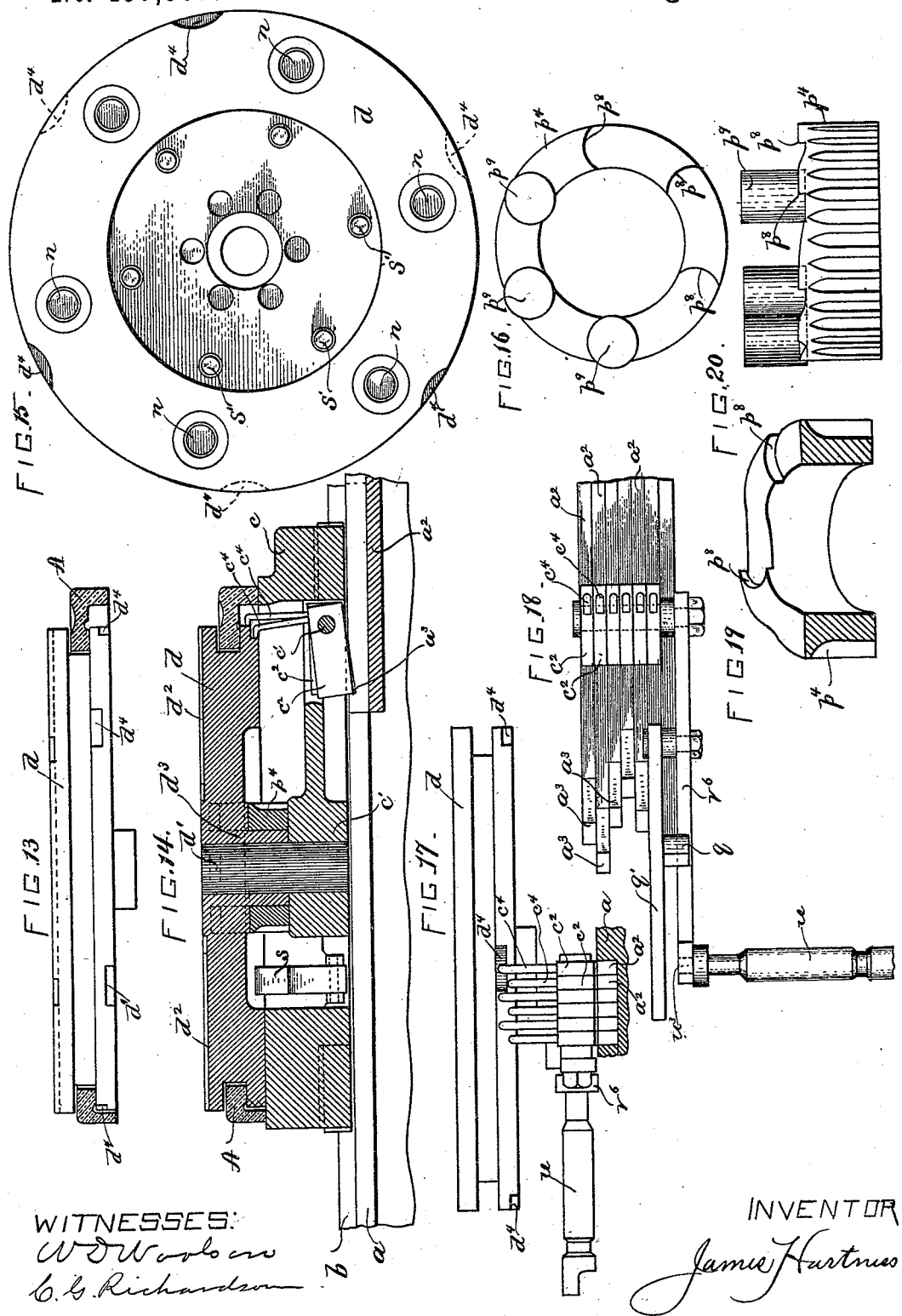

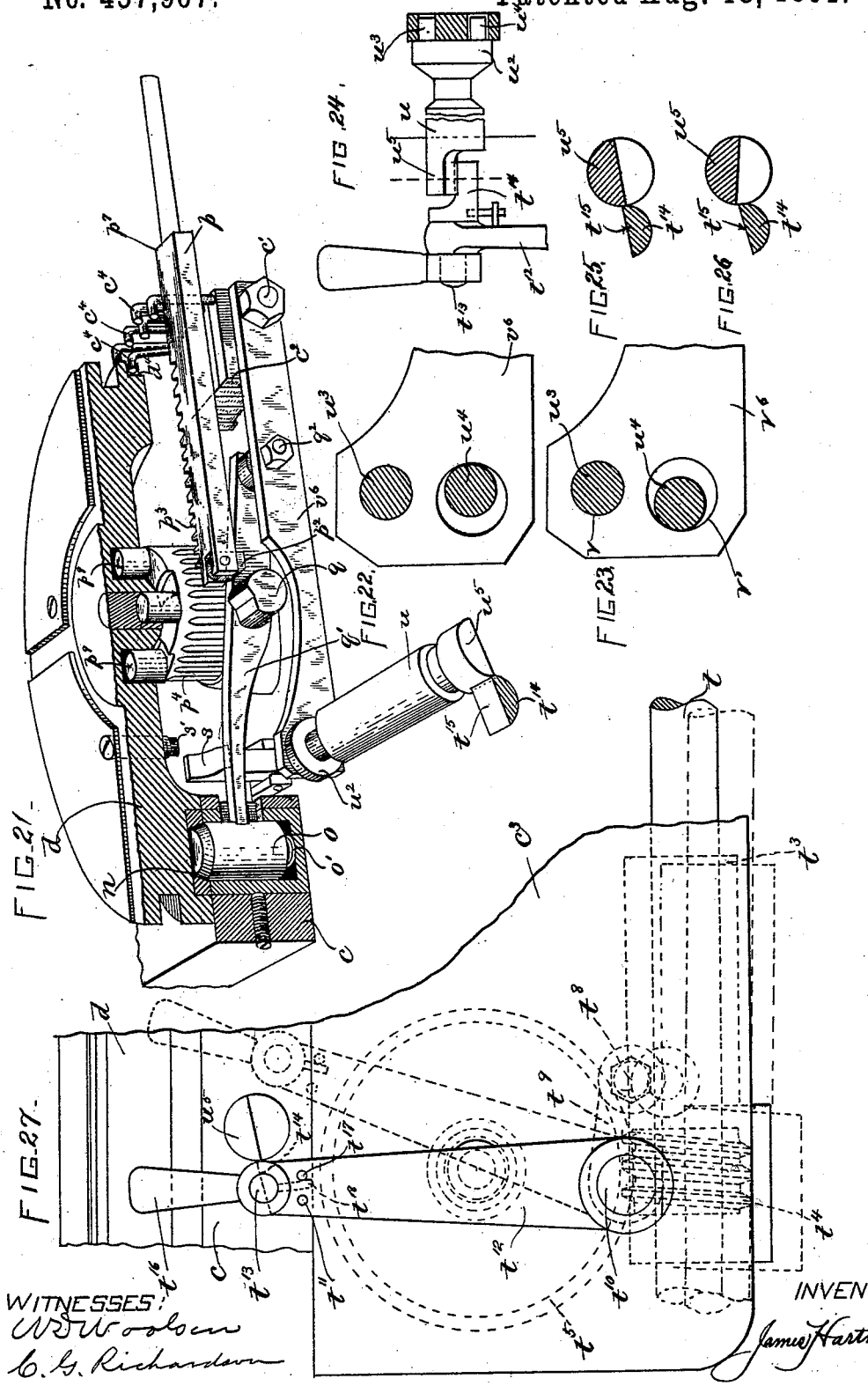

(No Model.) 12 Sheets—Sheet 8.
J. HARTNESS.
MACHINE FOR MAKING SCREWS.
No. 457,967. Patented Aug. 18, 1891.
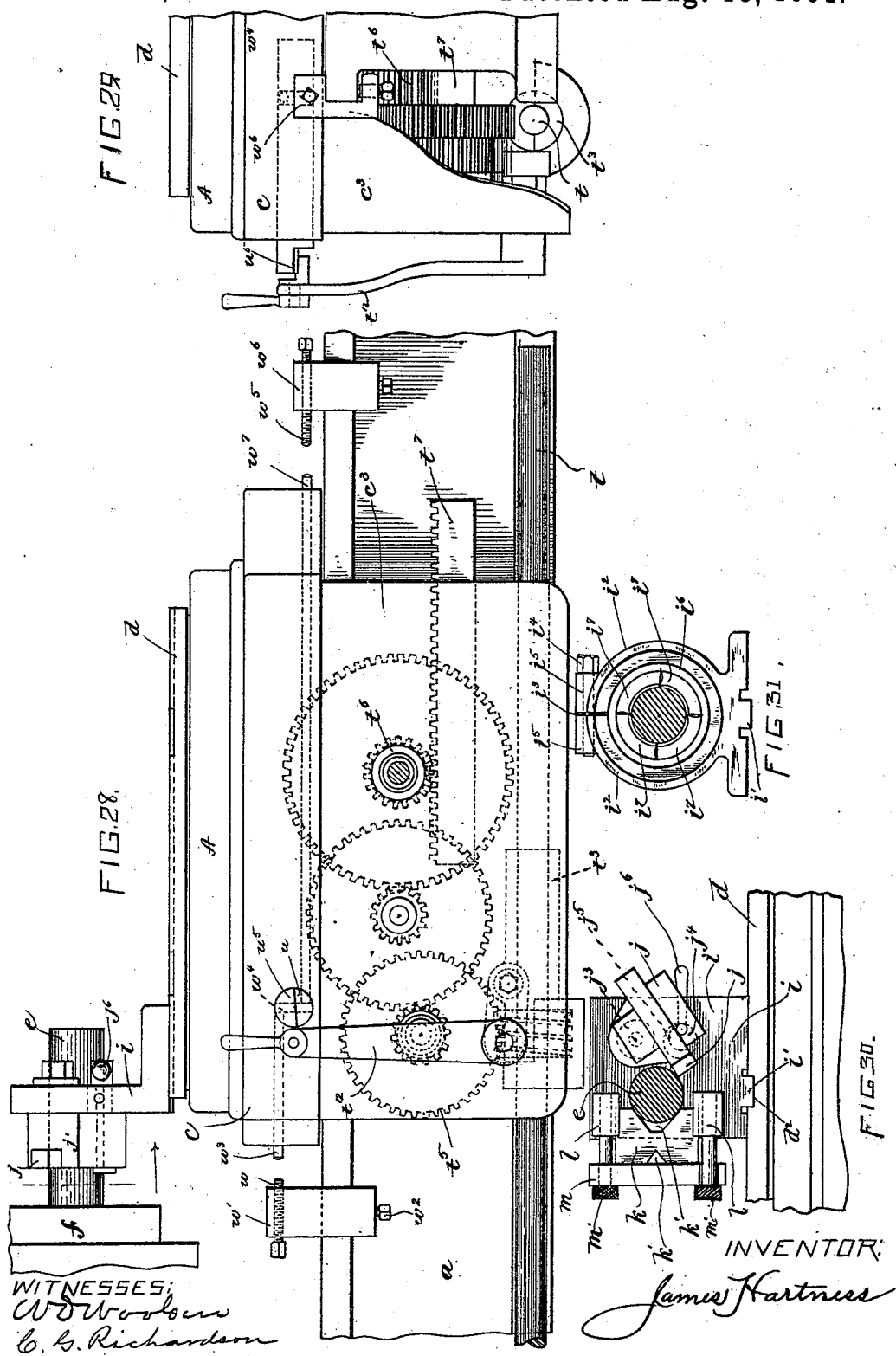
WITNESSES:
W. D. Woolson
C. G. Richardson
INVENTOR:
James Hartness

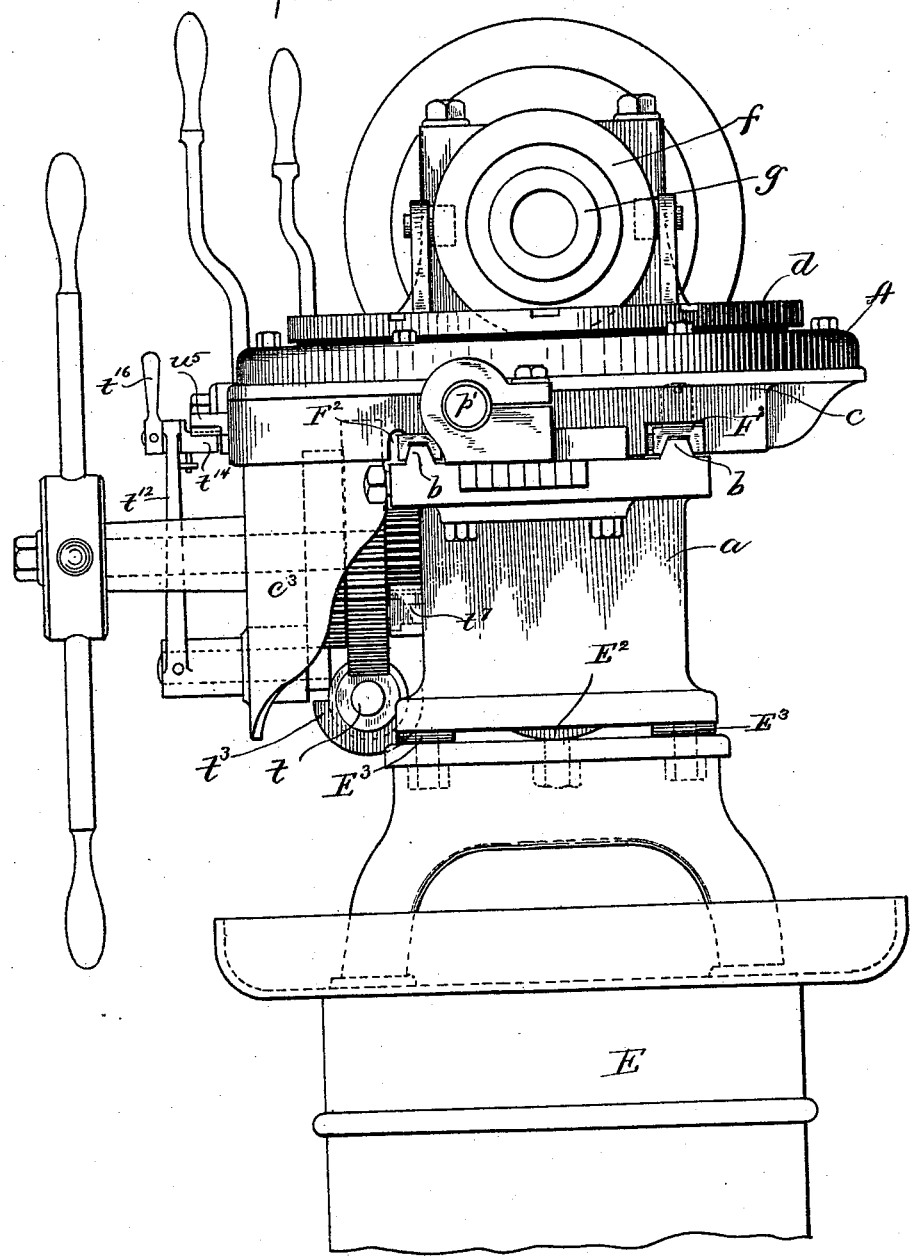

(No Model.) 12 Sheets—Sheet 10.
J. HARTNESS.
MACHINE FOR MAKING SCREWS.

No. 457,967. Patented Aug. 18, 1891.

WITNESSES:
W. D. Woodson
C. G. Richardson

INVENTOR:
James Hartness (No Model.) 12 Sheets—Sheet 11.
J. HARTNESS.
MACHINE FOR MAKING SCREWS.
No. 457,967. Patented Aug. 18, 1891.
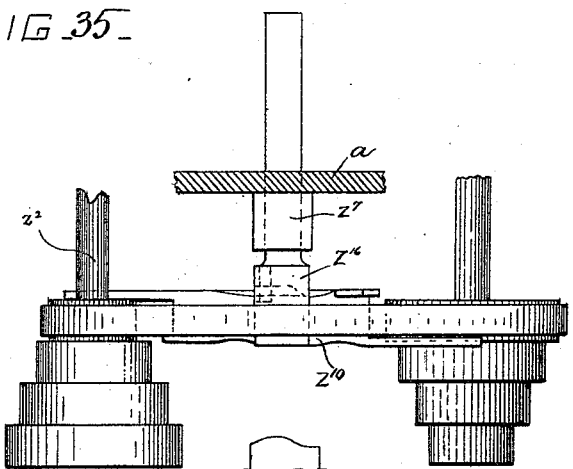
FIG. 35.
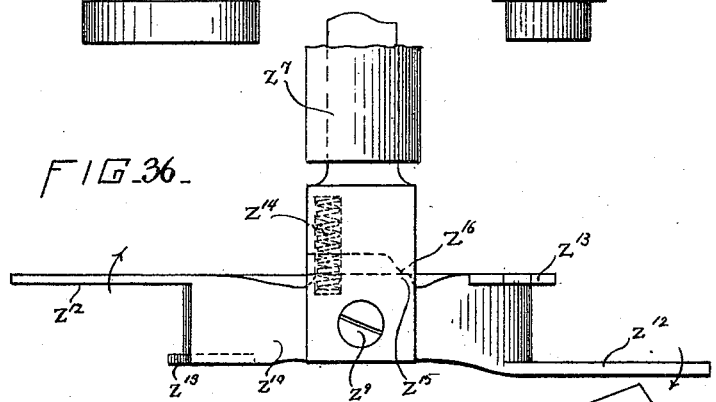
FIG. 36.
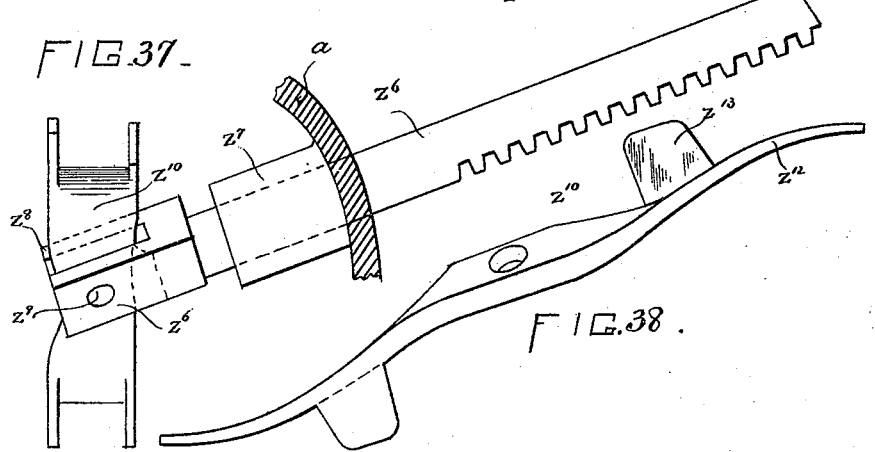
FIG. 37.
FIG. 38.
WITNESSES:
W D Woolson
C. G. Richardson
INVENTOR:
James Hartness (No Model.) 12 Sheets—Sheet 12.

J. HARTNESS.
MACHINE FOR MAKING SCREWS.

No. 457,967. Patented Aug. 18, 1891.

WITNESSES
W. D. Woolson.
C. G. Richardson

INVENTOR
James Hartness

UNITED STATES PATENT OFFICE.

JAMES HARTNESS, OF SPRINGFIELD, VERMONT.

MACHINE FOR MAKING SCREWS.

SPECIFICATION forming part of Letters Patent No. 457,967, dated August 18, 1891.

Application filed January 9, 1891. Serial No. 377,238. (No model.)

*To all whom it may concern:*

Be it known that I, JAMES HARTNESS, of Springfield, in the county of Windsor and State of Vermont, have invented certain new and useful Improvements in Turret-Lathes or Screw-Machines, of which the following is a specification.

This invention has for its object to provide a turret-lathe or screw-machine capable of performing a greater variety of work than any machine of this class now generally known, and particularly capable of turning long and comparatively slender pieces of work without deflecting or springing the work out of true when it is being acted upon at a distance from the chuck that holds and rotates it.

The invention also has for its object to enable several distinct operations to be performed on the same piece of work by a corresponding number of tools and to automatically determine the extent of operation of each tool, so that each can perform its allotted work and no more.

The invention also has for its object to provide various improvements in machines of this class looking to the accuracy, durability, and general efficiency of the machine.

To these ends the invention consists in the improvements which I will now proceed to describe and claim.

Figure 1:
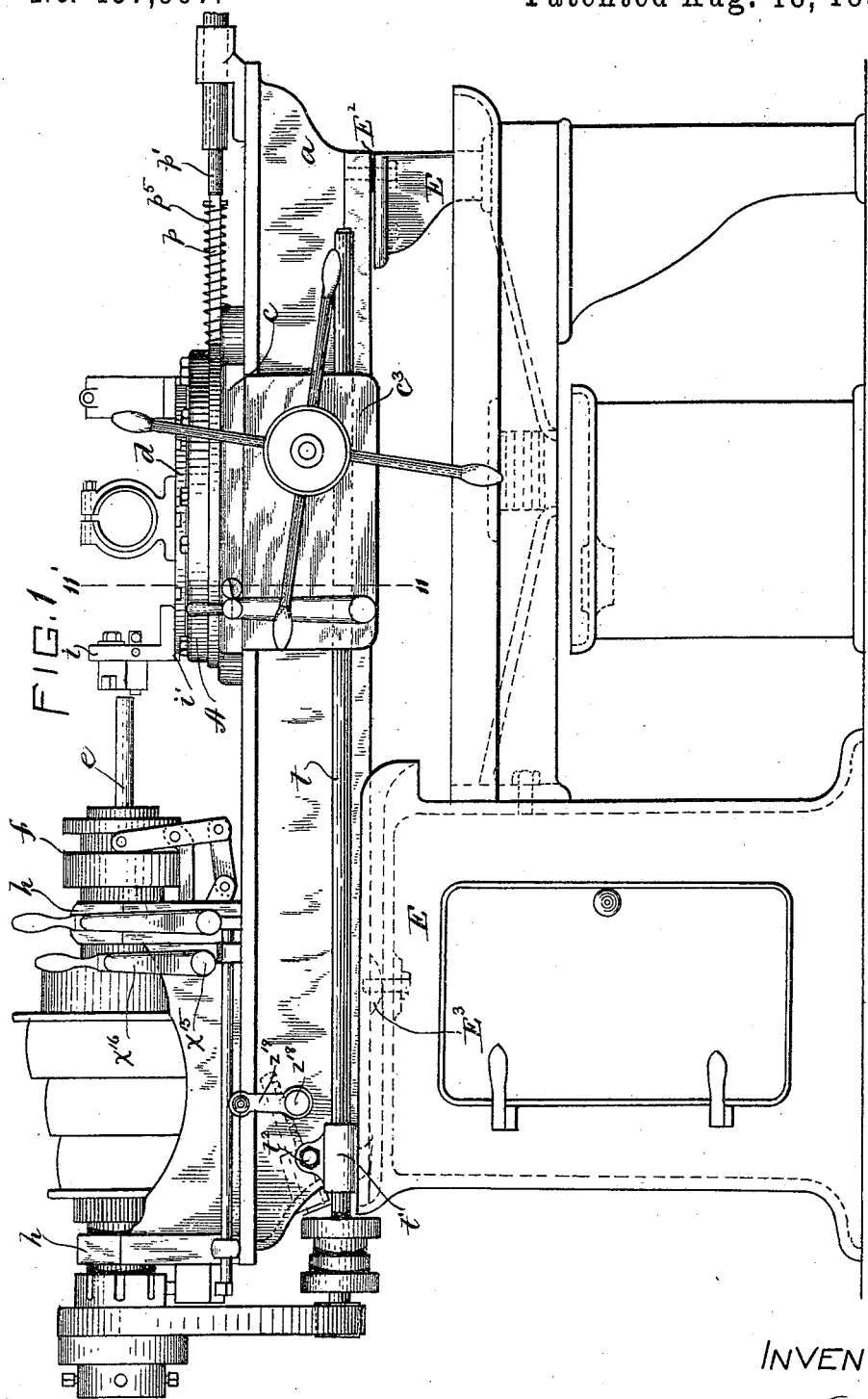
Figure 33:
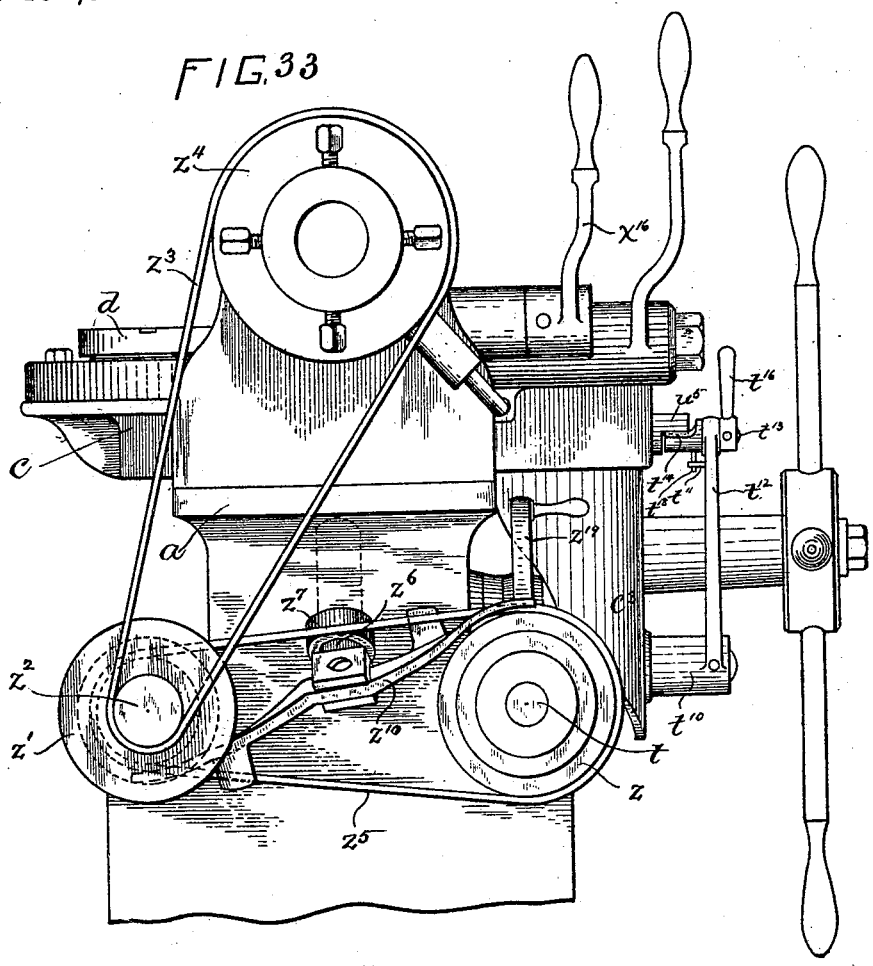
Figure 34:
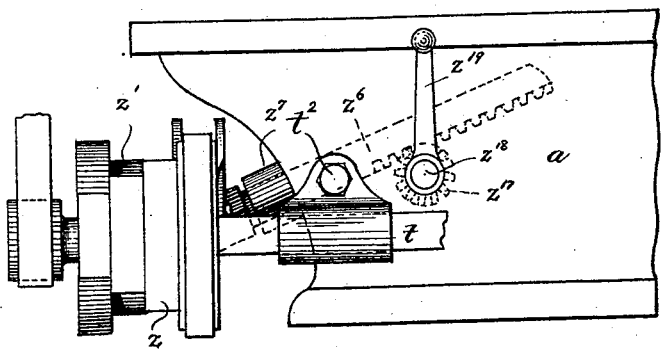
Figure 39:
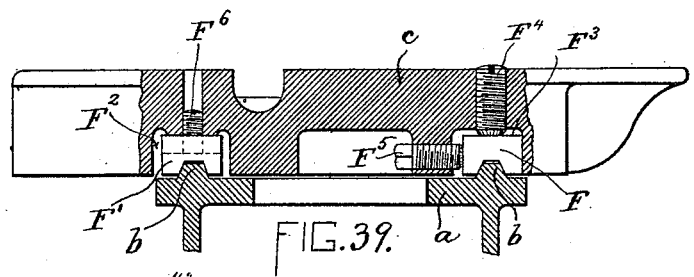
Figure 40:
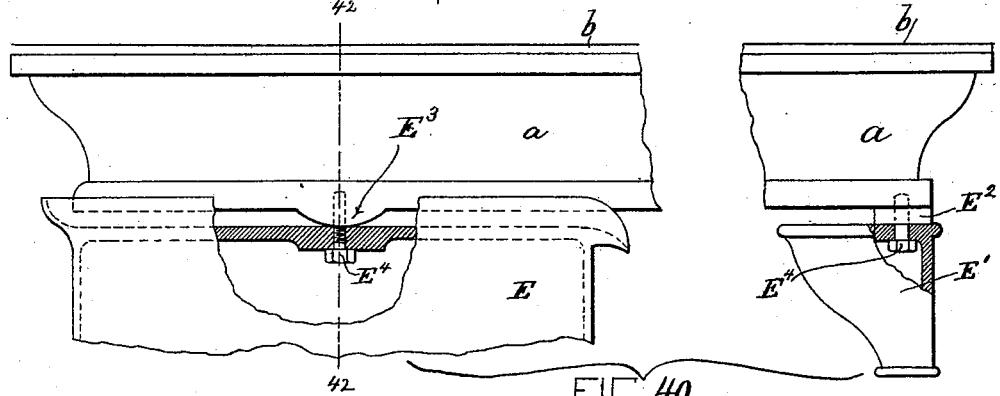
Figures 41, 42:
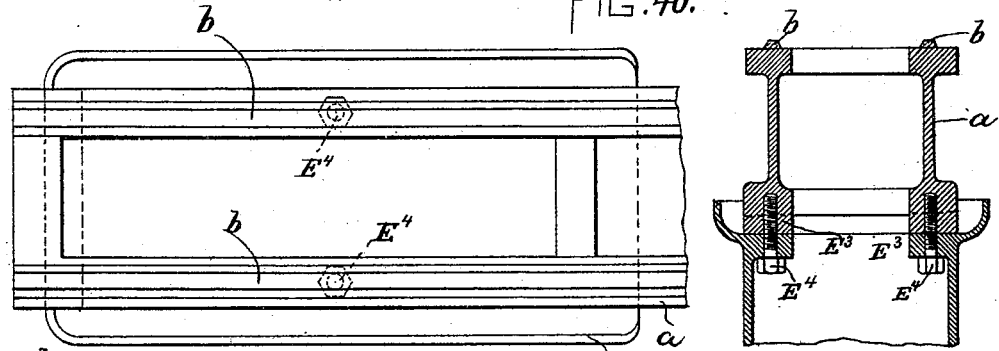
Figures 43, 44:
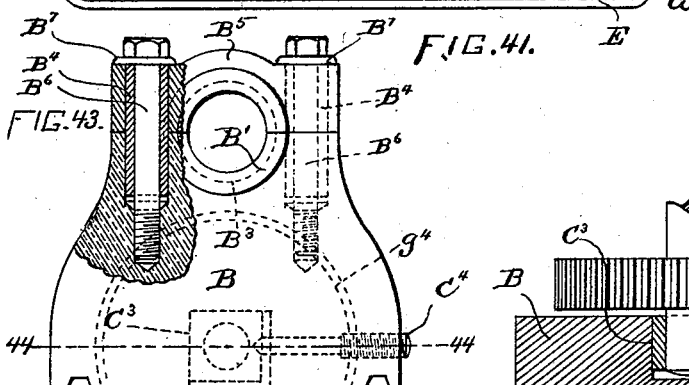

In the accompanying drawings, forming a part of this specification, Figure 1 represents a side elevation of a turret-lathe or screw-machine embodying my invention. Fig. 2 represents a top view of the same, the tools being removed from the turret or tool-holder. Fig. 3 represents a longitudinal section on line 3 3 of Fig. 2 on a larger scale. Fig. 4 represents a section on line 4 4 of Fig. 3. Fig. 5 represents a top view of a portion of the machine, showing the turret provided with a series of tools. Fig. 6 represents a top view of a portion of the bed of the lathe. Fig. 7 represents a side view of one of the adjustable bars on the lathe-bed. Fig. 8 represents a top view of a portion of the lathe-bed and the carrier thereon, the turret being removed to show the mechanism below it. Fig. 8ª represents a side elevation of a part of the construction shown in Fig. 8 on a larger scale, part of said Fig. 8ª being in section. Fig. 9 represents a sectional view of the carrier and turret, showing the turret locked to the carrier by the latch or index provided for that purpose. Fig. 10 represents a similar view showing the latch or index retracted to release the turret and permit its rotation. Fig. 11 represents a transverse section of the machine on the line 11 11 of Fig. 1. Fig. 12 represents a detail of the turret-rotating rack. Fig. 13 represents a side elevation of the turret and a sectional view of the gib that secures it. Fig. 14 represents a sectional view of the carrier and turret and a portion of the bed, showing the means for automatically arresting the forward movement of the carrier. Fig. 15 represents a bottom plan view of the turret. Fig. 16 represents a top view of the ratcheted pinion which forms a part of the turret-rotating mechanism. Fig. 17 represents a side view of the turret and a part of the automatic stopping mechanism. Fig. 18 represents a top view of the automatic turret stopping or arresting devices shown in Fig. 17. Fig. 19 represents a perspective sectional view of the ratcheted pinion shown in Fig. 16. Fig. 20 represents a side view of said pinion with some of its gravitating pawls resting on its upper end. Fig. 21 represents a perspective sectional view of the carrier and turret, together with portions of the mechanism for unlocking and rotating the turret and for disconnecting the turret and carrier from the feed-shaft. Figs. 22 to 26, inclusive, represent details of the disconnecting devices. Fig. 27 represents a side elevation of a portion of the carrier and feed-shaft, showing the means for supporting the feed-shaft in engagement with the train of gears on the carrier and for permitting the disconnection of the feed-shaft from said train. Fig. 28 represents a side elevation of a portion of the lathe-bed and the carrier and turret thereon. Fig. 29 represents an end view of the devices shown in Fig. 28. Figs. 30 and 31 represent views of different forms of operating-tools. Fig. 32 represents an elevation of one end of the machine. Fig. 33 represents an elevation of the opposite end of the machine. Fig. 34 represents a side elevosion of a portion of the bed, showing the means for operating the belt-shipper. Fig. 35 represents a top view of the belt-shipper and the cone-pulleys on which runs the belt with which the shipper is engaged. Fig. 36 represents a top view of the shipper removed from the belt. Fig. 37 represents a side view of the shipper, its operating slide or rack, and the fixed guide for said slide or rack. Fig. 38 represents an edge view of the shipper. Fig. 39 represents a transverse section of portions of the carrier and bed. Fig. 40 represents a side elevation of the bed, showing the supports of the bed partly in section. Fig. 41 represents a top view of the bed and one of its supports. Fig. 42 represents a section on line 42 42 of Fig. 40. Fig. 43 represents a side elevation of one of the heads supporting the lathe-spindle. Fig. 44 represents a section on line 44 44 of Fig. 43.

The same letters of reference indicate the same parts in all the figures.

In the drawings, $a$ represents the bed of the lathe, which is mounted on suitable legs or supports, and is provided with ways $b\ b$, upon which the carrier $c$ travels lengthwise of the bed. The rotary turret $d$, hereinafter described, is mounted upon the carrier $c$, said turret having a series of operating-tools which are adapted to be brought successively into position to act upon the stock $e$, held by the chuck $f$.

$g$ represents the spindle which supports the chuck and is rotated in suitable bearings $h$ in the head-stock of the lathe.

The turret $d$ is of circular form, and is provided at its center with a downwardly-projecting stud or journal $d'$, which is fitted to rotate in a bearing $c'$ in the carrier $c$, Fig. 14. On the upper surface of the turret is formed a series of radial grooves $d^2$, which receive projections $i'$ on the tool-carrying brackets $i$, said brackets being adapted to be adjusted as to their distance from the center of the turret by sliding in the grooves $d^2$. The brackets may be attached to the turret by any suitable means, as by bolts or screws passing through their bosses into holes in the bottoms of the grooves $d^2$. Each bracket $i$ carries a tool peculiar to itself, there being, therefore, a series of differently-shaped tools upon the turret. For example, one bracket may have a turning-tool, the next a milling-tool or a chasing-tool, &c., while another bracket may have a cutting-off tool. In Fig. 5 I have shown the bracket which is located in operative relation to the stock $e$, as provided with an ordinary turning-tool $j$, (shown also in Fig. 30,) said tool being secured to a holder $j'$, attached in any suitable way to the bracket $i$ and arranged to act on the periphery of the stock $e$. The holder $j'$ is here shown as pivoted at $j^3$ to the bracket and provided with a cam $j^4$, projecting from one side of the holder into an orifice $j^5$ in the bracket. One side of said cam bears on a stop at one side of the orifice $j^5$, and when the cam is turned half around from the position shown in Fig. 30, by means of its handle $j^6$, it moves the carrier inwardly to the predetermined position it occupies when in operation. Provision is thus made for quickly and accurately throwing the tool into its operative position. Said position may be varied by means of an adjustable stop-screw $j^7$, Fig. 5, located in the orifice $j^5$ in position to receive the bearing of the cam. The turning-tool is located at one side of the bracket $i$, that supports it, and said bracket has an orifice which receives the stock $e$, the stock passing through the bracket, as shown in Fig. 5, excepting when the movement of the carrier has conveyed the tool to the outer end of the stock, as shown in Fig. 1. I have shown some of the brackets on the turret as annular and formed to hold a series of tools with the annulus of the bracket. Each annular bracket has a base provided with a projection $i'$, as shown in Fig. 31, and with two semicircular sides $i^2\ i^2$, which collectively form a ring which is divided at its upper portion at $i^3$, so that the ring can be compressed by means of a bolt $i^4$, working in sockets $i^5\ i^5$ on the sides $i^2\ i^2$. Within the cut ring is placed a continuous or uncut ring $i^6$, constituting the holder for the series of tools $i^7$.

The form of holder last described is for round-shanked tools, and it may contain tools for milling, chasing, screw-cutting, &c.

I have shown three tool-holders on the turret in Fig. 5; but it is obvious that the number of these tool-holders may be greater or less, each holder having tools differing from those of the others. I also show in Fig. 5 a cutting-off tool $j^2$, mounted on a suitable bracket or support, which is engaged with one of the grooves of the turret.

To the bracket $i$, supporting the turning-tool $j$, I secure a rest $k$, formed to bear upon the stock at a point about opposite the point of bearing of the tool $j$ thereon. The object of this rest is to steady the stock and prevent it from being sprung or deflected to one side of its axis by the pressure of the tool against it, particularly when the tool is bearing on the stock at a point distant from the chuck, where the stock is rigidly held. This feature—viz., a rest which travels with the tool and supports the stock against the pressure of the tool—is one of considerable importance in turning elongated pieces of work which project to a considerable distance from the chuck when the work is not stiff enough to stand against the pressure of the tool. It will be observed that the rest $k$, moving with the tool and supporting the stock at the opposite side from the point where the tool acts, if arranged to bear on the periphery that has been turned by the action of the tool, or, in other words, to follow the tool, will enable long pieces of work to be accurately and rapidly turned, the rest following the tool and bearing on the surface produced by the tool throughout the entire operation, so that when the turning operation is commenced at a point close to the chuck and progresses away from the chuck the part first turned, which is rigidly supported by its close proximity to the chuck, becomes the guide for the whole turning operation by the bearing of the back-rest $k$ upon the turned surface. The back-rest $k$ is shown as a vertical plate having work-receiving notches $k'$ $k'$ in its opposite edges, (see Fig. 30,) said notches being of different sizes to accommodate different diameters of stock. The rest is secured by the insertion of its ends in slots in guide-blocks $l$ $l$, attached to the bracket $i$.

$m$ represents a vertical bar which is held against the rear edge of the rest $k$ by means of bolts $m'$ $m'$, working in tapped sockets in the guide-blocks $l$ $l$, said bar being adjustable by means of the bolts to adapt the rest to the diameter of the stock. The bar $m$ has an open slot at its lower end, which enables it to swing on and off the lower bolt $m'$, thus quickly releasing and confining the back-rest. The rest is thus enabled to be removed while the turning-tool is commencing its work and to be readily put in place after a surface has been formed by the tool of sufficient width to support the rest.

The turret is provided on its under side with a series of sockets $n$, Figs. 9, 10, 15, and 21, corresponding in number and position to the operating-tools above referred to. Said sockets co-operate with a locking bolt or index $o$, which is vertically movable in a socket in the carrier $c$, and is forced upwardly by a spring $o'$, so that it springs into any socket that may be brought into line with it by the rotation of the turret. Hence the turret may be locked in as many positions as there are sockets. The turret is locked in the manner described whenever an operating-tool is in position to act on the stock.

After the operating-tool has performed its allotted work on the stock and passed off from the same, as indicated in Fig. 1, the turret is first unlocked and then partially rotated to bring another tool into operative position by the means next described.

$p$ represents a bar, which is movable horizontally on the carrier $c$ and has a limited longitudinal movement in the direction of travel of the carrier upon the ways $b$. Said bar projects outwardly from the carrier and is in position to abut against the stop $p'$, attached to the lathe-bed $a$, when the carrier has nearly reached the limit of its movement away from the work-holding chuck. The contact of the bar $p$ with the stop $p'$ arrests the movement of said bar before the movement of the carrier is arrested, so that a dog $p^2$, pivoted to the forward end of the bar $p$, is caused to bear upon a projection $q$ on a lever $q'$, which is pivoted at $q^2$ to the carrier and moves therewith. The lever $q'$ is engaged at its swinging end with a slot in the locking-pin $o$, and is normally raised with said pin by the spring $o'$. It will be seen that when the dog $p^2$ comes in contact with the projection $q$ it depresses said projection, the lever $q'$, and the pin $o$, engaged with said lever, as shown in Fig. 10, thus unlocking the turret by retracting the locking-pin $o$ from the socket $n$, with which it was engaged. Upon the instant that the locking-pin is retracted a series of rack-teeth $p^3$, Figs. 8, 12, and 21, formed on the bar $p$, co-operates with a pinion $p^4$, Fig. 8, engaged with the turret in the manner presently described, and rotates said pinion and the turret during the concluding portion of the movement of the carrier, the turret being thus first automatically unlocked and then automatically rotated. The lever $q'$ is held in the depressed position to which it was forced by the dog $p^2$ by means of a spring catch or hook $s$, which engages the lever and holds the same depressed in the manner indicated in Fig. 11. The object of said hook is to prevent the locking-pin $o$ from engaging a socket $n$, that may be moved over it, unless it is intended that the turret shall be locked by the co-operation of such socket with the pin.

The turret is provided with a series of knocking-off screws $s'$, which are arranged in positions corresponding to the operating-tools, and are vertically adjustable in the turret, so that they can be adjusted, as shown in Fig. 11, to strike the catch $s$, or can be raised so that they will pass over the catch without striking it. When it is desired that the turret shall be stopped and locked when each operating-tool reaches its operative position, all the knocking-off screws $s'$ are depressed, so that each in turn will displace the catch $s$ and knock it off from the lever $q'$, thus permitting the spring $o'$ to project the pin $o$ into any socket that may come in line with it. If, on the other hand, it is desired to permit one of the operating-tools to pass by its operative position without being arrested, the screw $s'$ accompanying such tool is raised, so that it will pass over the catch $s$ without displacing the latter. Under these conditions the rotation of the turret will be continued until the catch $s$ is knocked off by a succeeding screw $s'$, said screw accompanying the tool that is to be locked in its operative position. The movement of the turret and its carrier away from the chuck having been completed, the carrier is moved back toward the chuck by a reversal of the mechanism that gives the carrier its progressive movement in case it is desired to prosecute the work while the turret is moving toward the chuck. Assuming this to be the case, the motion of the carrier-feeding mechanism is automatically reversed by any suitable means such as are well known in lathes now in general use, and the carrier and turret are moved toward the chuck, the tool operating on the stock during its movement toward the chuck. As the carrier moves toward the chuck, the bar $p$ during the first part of the movement of the carrier is held by the stress of a spring $p^5$ against the fixed stop $p'$ until the guide $p^6$ on the carrier, which supports the inner end of said spring, is sufficiently removed from the stop $p'$ to permit the spring to expand to its normal condition, and thus bring the shoulder $p^7$ against said guide $p^6$, as shown in Fig. 9. The bar $p$ is therefore held stationary against the stop $p'$ during the commencement of the backward movement of the carrier until it is restored to its normal position with relation to the carrier and turret. To prevent the rack-teeth of the bar $p$ from rotating the turret backwardly while said bar is thus held at rest during the commencement of the backward movement of the turret, I make the pinion $p^4$ free to rotate loosely in one direction upon an annular boss or bearing $d^3$, the arrangement being such that during the movement of the pinion $p^4$, caused by its engagement with the bar $p$ while the carrier is moving backwardly the pinion will rotate loosely. To this end the upper end of the pinion is provided with a series of teeth $p^8$, which are formed to engage a series of gravitating cylindrical dogs $p^9$, which are movable vertically in sockets formed for them in the turret, said teeth being of such form that when the pinion is rotating loosely, as last described, the inclined sides of the teeth will slip under the dogs and raise the same, so that they will not constitute an operative connection between the pinion and the turret. When the pinion is rotated in the opposite direction, however, to rotate the turret as first described, the vertical sides of the teeth $p^8$ engage the dogs $p^9$ in such way as to impart rotary motion to the turret through said dogs. After the bar $p$ has reached a bearing on the guide $p^6$ the bar moves with the carrier and turret and the backward rotation of the pinion ceases.

My invention includes automatic means for automatically disconnecting the feed mechanism from the carrier during the movement of the latter toward the chuck when the turret is at any desired point in the movement of the turret toward the chuck, so that the operating-tool may be caused to cease its operation at any desired point. To this end I provide the bed with a longitudinal recess $a'$, Fig. 6, in which are placed a series of parallel bars $a^2$, of which there are as many as there are operating-tools on the turret. Each bar $a^2$ is provided near its forward end, or the end nearest the chuck, with a notch $a^3$.

Pivotally connected to the carrier $c$ by means of a stud or pivot $c'$ is a series of dogs $c^2$, corresponding in number to the bars $a^2$. Said dogs are arranged over the bars $a^2$, each dog coinciding with one of the bars, so that when any dog reaches a position over the notch $a^3$ of the bar under it it will drop into said notch and thereby cause the automatic disconnection of the feed mechanism from the carrier through the intermediate devices next described.

$t$ represents the shaft of the feed mechanism, the same being mounted near one end in a bearing $t'$, which is pivoted at $t^2$ to the fixed frame of the machine (see Fig. 1) and is mounted near its other end in a vertically-movable bearing $t^3$, Figs. 27 and 28. The feed-shaft $t$ has a worm $t^4$, which meshes with the gear $t^5$ of the train of gearing mounted on the apron $c^3$ of the carrier $c$, the pinion $t^6$, forming the last member of said train, engaging a rack $t^7$, affixed to the supporting-frame. The rotation of the train of gearing, imparted thereto through the feed-shaft $t$, causes the engagement of the pinion $t^6$ with the rack $t^7$ to move the carrier and turret along the bed of the lathe, this being an ordinary form of feed mechanism and adapted to move the carrier and turret in either direction, according to the direction of rotation imparted to the shaft $t$.

The vertically-movable bearing $t^3$ of the shaft $t$ is pivotally connected at $t^8$ with an arm $t^9$, attached to a rock-shaft $t^{10}$, which is mounted in bearings in the apron $c^3$. To said rock-shaft is affixed a lever $t^{12}$, projecting upwardly and having a short shaft or stud $t^{13}$ journaled in a socket in its upper end. On one end of the stud or shaft $t^{13}$ is formed an enlargement $t^{14}$, which is cut away on its upper side to form a flat surface $t^{15}$. (See Figs. 21, 25, and 26.)

$u$ represents a cylindrical stud fitted to rotate in a socket or bearing in the carrier $c$ and held in engagement with said carrier by a screw $u'$, Fig. 11, inserted in the carrier and entering a groove in the stud $u$. The inner end of the stud $u$ has a collar or enlargement $u^2$ affixed to it. From one side of said collar project two pins $u^3$ $u^4$ into holes $v$ $v$, formed in the bar $v^6$, which is suitably secured to the carrier, so as to move therewith, preferably by being mounted upon the studs $c'$ and $q^2$, which respectively support the dogs $c^2$ and the lever $q'$, as shown in Fig. 21. It will be observed by Fig. 23 that the orifice $v$ in the bar $v^6$ closely fits the pin $u^3$, while the orifice $v'$ is considerably larger than the pin $u^4$. When the bar $v^6$ is held in its normal position by a spring $v^8$, it holds the stud $u$ in the position shown in Figs. 21, 24, and 27, the pin $u^4$ bearing against the rear side of the enlarged orifice $v'$, as shown in Fig. 22. When the stud is in this position, a semicircular projection $u^5$ on its outer end is in position to engage one edge of the enlargement $t^{14}$ on the lever $t^{12}$, as shown in Figs. 21, 24, 25, and 27. Hence the lever $t^{12}$ is held by the projection $u^5$ in the position shown in full lines in Fig. 27, the bearing $t^3$ being thus supported in its raised position and caused to hold the worm $t^4$ in engagement with the gear $t^5$. When one of the dogs $c^2$ engages a notch $a^3$ in the corresponding bar $a^2$, the turret and the carrier would be thereby locked to the bed of the lathe, but for a slight yielding movement which the turret and carrier are permitted to have by reason of the enlarged orifice $v'$ in the bar $v^6$. The lower pin $u^4$ on the stud $u$ is permitted sufficient play in the said orifice $v'$ to permit the turret, the carrier, and the bar $v^6$ to move slightly forward after the engagement of one of the dogs with one of the notches $a^3$ until the lower pin $u^4$ has moved across to the other side of the enlarged orifice $v'$, or, in other words, from the position shown in Fig. 22 to that shown in Fig. 23, the result being the partial rotation of the stud $u$ from the position shown in Figs. 21, 24, 25, and 27 to that shown in Fig. 26. The projection $u^5$ on the stud $u$ is thus disengaged from the projection $t^{14}$ on the lever $t^{12}$, so that said lever is no longer supported at its upper end, and is free to be moved by the weight of the shaft $t$ to the position shown in dotted lines in Fig. 27, the feed-roll shaft being thus allowed to fall sufficiently to remove its worm $t^4$ from engagement with the gear $t^5$. The feed movement of the carrier and turret is therefore arrested until the operator, grasping a handle $t^{16}$ on the short shaft $t^{13}$ at the outer end of the lever $t^{12}$, restores said lever to the position shown in full lines in Fig. 27 and re-engages the projection $t^{14}$ with the projection $u^5$. The shaft $t^{13}$ has a limited rocking movement in its bearing in the lever $t^{12}$ to permit the re-engagement of the projection $t^{14}$ with the projection $u^5$, said movement being limited by two stops $t^{17}$ on the lever and a pin $t^{18}$ on the shaft $t^{13}$, adapted to play between said stops.

Each dog $c^2$ is permitted to drop into engagement with the notch of the corresponding bar $a^2$ only when the turret is adjusted to bring the operating-tool corresponding with said dog into its operative position, there being, as before stated, one dog for each tool, each dog operating to effect the automatic disconnection of the feed-shaft in the manner above described only when the tool it accompanies is in position to operate on the stock.

The turret is provided with a series of recesses $d^4$, corresponding in number and position to the tool on the turret, there being in this instance six of said recesses, as shown in Fig. 15, arranged at equal distances apart, like the operating-tools on the turret. Said recesses co-operate with upwardly-projecting pins $c^4$, attached to the dogs $c^2$. The recesses $d^4$ are formed and arranged so that only one of the entire series of fingers $c^4$ can coincide at a time with a recess. When the turret is adjusted with one of its tools in operative position, the recess $d^4$ corresponding to that tool is in position to receive the pin $c^4$ on the corresponding dog $c^2$, the recess allowing the pin $c^4$ to swing forward and the dog $c^2$ to drop below the surface of the carrier sufficiently to engage a notch $a^3$, as shown in Fig. 14. The dog whose finger coincides with a recess $d^4$ is therefore free to drop into the corresponding notch $a^3$ when the movement of the carrier brings it to said notch, said dog riding on the upper surface of the bar $a^2$ until it reaches the notch. For convenience I divide the pins $c^4$ into two series, those of one series being taller than those of the other, as shown in Figs. 14, 17, and 21. The recesses $d^4$ are likewise divided into two series, those of one series being higher than those of the other. The higher recesses are arranged to engage the taller pins $c^4$, while the lower recesses are arranged to engage the shorter pins. This arrangement prevents the possibility of more than one pin coinciding with a recess at one time. It will be seen that by adjusting the bars $a^2$ any operating-tool on the turret may be stopped at any desired point, so that the extent of operation of each tool may be predetermined. The bars $a^2$ may be secured at any points within the range of their adjustability by set-screws $a^4$, Fig. 5, inserted in a plate $a^5$, affixed to the bed $a$ and arranged to bear upon the upper surfaces of the bars $a^2$.

In Figs. 28 and 29 I show as an additional means for automatically disconnecting the feed-shaft from the carrier during the movement of the carrier toward the spindle an adjustable stop-screw $w$, supported by an adjustable bracket $w'$, which is secured by a set-screw $w^2$ to the lathe-bed $a$, and is arranged to strike a sliding rod or pin $w^3$ in the carrier $c$ when the carrier in moving forward brings said rod to the stop-screw. The inner end of the rod $w^3$ bears on the upper end of a web $w^4$ on the stud $u$, as shown in dotted lines in Fig. 28, said web being formed by cutting slots in opposite sides of the stud, the bottom of the slots constituting the sides of the web. When the rod $w^3$ strikes the stop-screw $w$, the rod is moved backward and causes a partial rotation of the stud $u$, thereby disengaging the projection $u^5$ on said stud from the projection $t^{14}$ on the lever $t^{12}$, the result being the release of the lever and the depression of the feed-shaft, so that the feed movement of the carrier and turret is stopped.

I also show in Figs. 28 and 29 another stop-screw $w^5$, supported by a bracket $w^6$, secured to the lathe-bed at the opposite side of the carrier and turret from the stop-screw $w$ and its supporting-bracket $w'$. The stop-screw $w^5$ is arranged to strike a sliding rod $w^7$, which is movable in the carrier and bears upon the lower end of the web $w^4$, the arrangement being such that when the carrier, moving away from the chuck, brings the rod $w^7$ in contact with the stop-screw $w^5$ the stud $u$ is rotated in the manner last described to release the lever $t^{12}$ and again disconnect the feed-shaft $t$.

My invention includes the combination, with the chuck-carrying spindle $g$, of two distinct types of clutch—one for locking the spindle to the cone-pulley, through which rapid rotation is imparted to the spindle, and the other for locking the spindle to the gear, by means of which the spindle is rotated more slowly when greater power is desired. It is well-known that the cone-pulley is used when high speed is to be imparted to the spindle, light duty being required of the machine, while the gear is used when the spindle is run at a slow rate of speed and performs heavier duty. This part of my invention includes the employment of the friction-clutch to connect the spindle with the cone-pulley and a positive clutch to connect the spindle with the gear, these different types of clutch being employed because I find that the friction-clutch is better suited to the requirements of the cone-pulley, which has to be connected with the spindle when rotating so rapidly that the employment of a positive clutch would give the machine a shock when making the connection. This shock is prevented by the slipping of the friction-clutch employed to connect the cone-pulley with the spindle. On the other hand the positive clutch is best suited for the connection of the gear with the spindle, because the gear rotates slowly, and it is not desirable to have any slipping in the members of the clutch that connects the gear with the spindle.

My improved combination of clutches is best shown in Fig. 3. $x$ represents the cone-pulley, which is normally loose upon the spindle $g$. $x'$ represents a sleeve which is rigidly affixed to the spindle so as to rotate therewith, said sleeve being located within the cone-pulley. $x^2$ represents a sleeve which is fitted both to slide upon and rotate with the sleeve $x'$, the two sleeves being connected by a key or feather $x^3$. One end of the sleeve $x^2$ is beveled at $x^4$, and is arranged to bear against correspondingly-beveled faces on radial slides $x^5$. Said slides are connected at their outer ends with wedges or wedge-shaped blocks $x^6$, which are interposed between segmental friction-plates $x^7$ $x^7$, the ends of which are beveled to fit the sides of the blocks $x^6$, as shown in Fig. 4. The sleeve $x^2$ is engaged with an annular plate $x^8$, the inner edge of which is fitted loosely in a peripheral groove formed in said sleeve. The periphery of the annular plate $x^8$ is secured to a flange $x^9$, formed on a collar $x^{10}$, which is fitted to slide upon the spindle $g$, and is provided with an ear $x^{12}$, with which is connected by pin $x^{13}$ an arm $x^{14}$ on a short shaft $x^{15}$, journaled in bearings in the frame which supports the bearings of the spindle $g$. Said shaft $x^{15}$ has an operating lever or handle $x^{16}$, by which the operator may turn the shaft in either direction, and thus cause the arm $x^{14}$ to move the collar $x^{10}$ and, through the described connections, the sleeve $x^2$ lengthwise of the spindle. On the end of the sleeve $x^2$ opposite the beveled face $x^4$ are formed clutch-teeth $x^{16}$, which are formed to engage corresponding clutch-teeth $y$ on the hub of the gear $y'$, which imparts slow motion to the spindle. When the sleeve $x^2$ is moved in the direction indicated by the arrow in Fig. 3, its beveled face, bearing on the beveled slides $x^5$, forces said slides outwardly, and thus causes the wedge-shaped blocks $x^6$ to press the segmental plates $x^7$ against the inner surface of the cone-pulley, thereby establishing a frictional connection between the said pulley and the spindle through the described intermediate devices. When the sleeve $x^2$ is moved in the opposite direction, the slides $x^5$ are released and the frictional connection of the cone-pulley with the spindle is discontinued. At the same time the positive clutch-teeth $x^{16}$ on the sleeve $x^2$ engage the clutch-teeth $y$ on the gear $y'$ and positively engage said gear with the spindle. The gear $y'$ is rotated by engagement with a smaller gear $y^2$ on a shaft $y^3$, which is provided with a gear $y^4$, meshing with a pinion $y^5$, affixed to the hub at one end of the cone-pulley $x$. It will be seen, therefore, that when the cone is engaged with the spindle directly by means of the friction-clutch devices the gear $y'$ is disengaged, the spindle being rotated synchronously with the cone. When the gear $y'$ is engaged with the spidle, the direct frictional connection between the cone and the spindle ceases and the spindle is rotated at a slower rate and with greater power through the described gearing.

I do not limit myself to the particular construction of the frictional and positive clutches above described, but may use any suitable clutch mechanisms adapted to operate alternately, one establishing a frictional connection between the cone and spindle and the other a positive connection between the spindle and gear.

The feed-shaft $t$, that imparts the feed movements to the carrier and turret, is provided at one end with the usual cone-pulley $z$ and receives motion from another cone-pulley $z'$ upon a shaft $z^2$, which is connected by a belt $z^3$ with a pulley $z^4$ on the spindle, the pulleys $z$ and $z'$ being connected by belt $z^5$. This is an ordinary arrangement for imparting motion from the spindle to the feed-shaft and in itself forms no part of my invention. I have therefore devised an improved belt-shipper adapted to readily shift the belt $z^5$ from section to section of the cone-pulleys $z$ and $z'$. Said shipping device, which is shown in Figs. 33 to 38, inclusive, comprises a longitudinally-movable slide or rack $z^6$, which is fitted to slide in an inclined guide or socket $z^7$ in the bed $a$ of the lathe and has its outer end enlarged and provided with ears $z^8$ $z^8$, to which are connected by a pivot $z^9$ the shipper-bar $z^{10}$. Said bar is arranged in an inclined position, as shown in Fig. 33, so that one of its ends is above the cone-pulley $z$ on the feed-shaft $t$, while its other end is below the cone-pulley $z'$ on the shaft $z^2$. The inclination of the slide or rack $z^6$ is such that when the rack is moved lengthwise the ends of the shipper-bar will move in lines parallel with the pitch or longitudinal inclination of the respective pulleys $z$ and $z'$, said pulleys being reversely arranged, so that the inclination of the under side of one is in a line parallel with the upper side of the other.

The ends of the shipper-bar are provided with belt-engaging fingers, each end having an elongated finger $z^{12}$, which extends in the general direction of the length of the bar and is preferably slightly curved, and a shorter finger $z^{13}$, which extends substantially at right angles to the direction of the length of the bar and is arranged at the opposite edge of the bar from the finger $z^{12}$. The longer finger at one end of the bar is arranged at the opposite edge of the bar from the longer finger at the other end, and the same is true of the shorter fingers.

It will be seen by reference to Fig. 35 that the longer fingers $z^{12}$ are arranged to act in moving the belt from a smaller to a larger step of the accompanying pulley, the shorter fingers $z^{13}$ acting to keep the belt in engagement with the shipper-bar, the fingers $z^{13}$ being at one edge and the fingers $z^{12}$ at the opposite edge of the belt.

The described form and arrangement of the shipper-bar and means for giving it motion in a direction parallel with the inclination of the portions of the pulleys with which the ends of the bar co-operate enable the bar to readily shift the belt from a smaller to a larger step on one pulley and at the same time from a larger to a smaller step on the other pulley. The pivotal connection of the shipper-bar on the ears on the rack $z^6$ gives the bar a certain freedom to swing longitudinally, and thereby enables it to perform the operation of shipping the belt. A spring $z^{14}$, placed in a socket in the enlarged outer end of the rack $z^6$ and bearing at its outer end on the shipper-bar at one side of the pivot $z^9$ holds said shipper-bar at $z^{15}$ against a shoulder $z^{16}$, Fig. 36, on the enlarged outer end of the rack, said spring normally holding the shipper-bar in the position shown in Fig. 36 and enabling its longer fingers $z^{12}$ to yield in the directions indicated by the arrows on said fingers, and thus act yieldingly in shipping the belt from the smaller to the larger sections of each pulley. The shipper-bar is moved to shift the belt by means of a pinion $z^{17}$ on a shaft $z^{18}$, which is journaled in bearings in the bed $a$ and is provided with a crank $z^{19}$, arranged to be grasped by the operator, who is enabled by turning the crank to move the shipper-bar in one direction or the other, as the case may be. The slide $z^6$ of the belt-shipper may be operated by any suitable means, instead of by the rack-teeth and pinion.

Having now described the essential parts of the machine, I will now proceed to describe certain subordinate improvements which constitute features of my invention, said improvements being as follows:

First, the connection of the turret to the carrier. The turret, instead of being secured only at its center, as in the turrets of all lathes heretofore constructed, is secured by an annular gib A, which is suitably secured to the carrier, and is here shown as engaged with a groove in the periphery of the turret, the gib being composed of a horizontal flange or ring entering said groove and a base projecting downwardly from said flange or ring and bearing on the carrier. By thus securing the turret at its margin I prevent the possibility of tipping or deflection of the turret by the strain exerted upon it by the requirements of the work, it being impossible for the turret to be raised at any point from its bearing on the carrier. I do not limit myself, however, to the engagement of the gib with a groove in the periphery of the turret, as the same result would be produced by locking the gib inside of said periphery as by forming an annular recess or groove in the under side of the turret at a point within its periphery, the gib being formed to project into said groove. The described connection of the turret to the carrier by a gib outside of the center of the turret renders a pivotal connection between the center of the turret and the carrier of minor consequence, so that said pivotal connection may be dispensed with, if desired.

Second, the means for securing the boxes in which the spindle $g$ rotates to the frame of the machine. B B$^2$ represent heads which are affixed to the bed of the lathe and support the boxes B' B', in which the spindle $g$ rotates. Said heads B and B$^2$ are provided at their upper portions with concave seats B$^3$ for the boxes B' and are provided at opposite sides of said seats with hollow posts B$^4$ B$^4$, which are driven firmly into holes formed in the heads B B$^2$ and project above the upper ends of said heads. B$^5$ B$^5$ represent caps, which are made concave on their under sides and are provided with orifices to receive the hollow posts B$^4$. Said caps are placed upon the hollow posts and hold the boxes B' B' in place upon their seats B$^3$. Bolts B$^6$, having enlarged heads B$^7$, pass through the hollow posts and into tapped orifices in the heads B B$^2$ below said posts, the heads of said bolts bearing on the cap B$^5$. By the employment of the hollow posts driven rigidly into the heads B B$^2$, I virtually carry the heads upwardly through the cap B$^5$, the hollow posts being in effect extensions of the heads. Hence there will be no possibility of the caps B$^5$ working loose and being laterally displaced, as there would be if they were simply secured to the heads by adjustable bolts.

Third, the means for supporting the back gear-shaft $y^3$. Said shaft is journaled in adjustable boxes C, which are inserted in recesses C' C$^2$, formed, respectively, in the heads B B$^2$. Each of said recesses is made considerably larger than the box it contains and has one of its sides carefully planed or dressed to form a vertical seat C$^3$ for the box which it receives, the box bearing only on said seat and being free from contact with the other surfaces of the recess. Hence the boxes may be vertically adjusted in the recesses by sliding them up and down upon the seats C$^3$. The boxes C are held in the recesses C' C$^2$ by means of pointed set-screws C$^4$, which work in tapped sockets in the head and bear upon the sides of the boxes opposite the sides that rest on the seat C$^3$. The described construction enables the boxes C to be adjusted to any desired height to enable the gears $y^2$ $y^4$ to properly mesh with the corresponding gears $y'$ and $y^5$, so that any variation in the sizes to which said gears are cut may be compensated for, a result which is very desirable in machines of this class, because it is not always practicable to maintain uniformity in the sizes of the gears. In practice the boxes containing the shaft $y^3$ are placed in the recesses $C'$ $C^2$ and adjusted till the gears on said shaft are properly engaged with the gears above them. The set-screws are then adjusted to secure the boxes in their adjusted position. It will be seen that the enlarged recesses and the set-screws holding the boxes against the sides of the recesses conduce to cheapness of construction, it being necessary to plane or dress only one side of each box and one side of each recess, the other sides being left rough.

Fourth, the means for cushioning the sliding rack $p$ upon the carrier when the motion of said rack is arrested by the stop $p'$ to prevent a violent shock or jar. The stop $p'$ is made as a plunger fitted to slide in a fixed cylindrical holder D, Fig. $8^a$. Said plunger $p'$ closely fits the interior of the holder D, so that a body of air is confined between the inner end of the plunger and the inner end of the holder, said air constituting a cushion which is compressed by the impact of the rack-bar $p$ against the plunger. The plunger has to check the momentum of the carrier and its entire load. Hence the utility of the air-cushion behind the plunger will be obvious. A spring $D'$ is placed behind the plunger in the holder to force the plunger outwardly to its normal position after the rack has been separated from the plunger by the backward movement of the carrier. The holder D is rigidly secured to a bracket $D^2$, which is suitably affixed to the lathe-bed $a$.

Fifth, the means for supporting the lathe-bed and enabling it to conform to an uneven floor without liability of deflection or sagging of the bed. The lathe-bed has two independent supports, one of which is known as a "cabinet-leg" E, which is located under one end of the bed, while the other is a smaller leg $E'$, located under the opposite end of the bed. The under side of the lathe-bed is provided at the end over the leg $E'$ with a downwardly-projecting bearing $E^2$, which is located at about the center of the width of the bed, between the opposite sides thereof, as shown in Fig. 32. Said projection is the only part of the bed that bears upon the leg $E'$, and it presents a curved under surface, which enables the leg or the bed to be independently inclined to a slight extent without material variation in the position of the bearing or point of contact of the bed with the leg. The bed is provided at its opposite sides with two other downwardly-projecting bearings $E^3$ $E^3$, which rest upon the horizontal upper surface of the cabinet-leg E, said bearings $E^3$ $E^3$ being located between the single end bearing $E^2$ and the opposite end of the bed. It will be seen that the bearings $E^3$ $E^3$, both resting upon the cabinet-leg, give the bed sufficient lateral support to permit the cabinet-leg to stand more or less out of plumb, if caused to so stand by the imperfections of the floor, without affecting the support of the bed. The bed is affixed to the legs E and $E'$ at the bearings $E^2$ $E^3$ $E^3$ by means of bolts $E^4$, passing through said bearings. (See Figs. 40 to 43, inclusive.) It will be observed that the described means for supporting the bed and connecting it to the legs prevents any possibility of twisting or deflecting the bed by unevenness of the floor. The pivotal points or bearings are so near the center of the work that the work has practically the same rigidity that it would have if the bed were supported on legs rigidly attached to its four corners in the old way. Some attempts have been made heretofore to prevent the twisting of the bed by the unevenness of the floor, such as by the employment of legs pivoted to the floor and of jointed legs pivoted near the floor; but in all cases the pivot points or connections have been too low, so that they cause an unsteadiness of the lathe, an objection which is overcome by my improvement. Another advantage of the described construction is the perfect bearing of the bed obtained by locating the said bearings $E^3$ $E^3$ at some distance from the end of the lathe-bed which they support and considerably nearer the end support $E^2$ than they would be if located at the extreme end of the bed. The supports or bearings are thus brought nearer together, thus reducing the possibility of deflection of the bed by the sagging of the same between its points of support.

Sixth, the manner of connecting to the carrier $c$ the shoes F $F'$, that run upon the guides $b$ of the lathe-bed $a$. The carrier is provided with two parallel grooves or recesses $F^2$ $F^3$, Figs. 32 and 39, which receive said shoes, said recesses being located over the guides $b$. The shoe F is rigidly affixed to the carrier by means of set-screws $F^4$ $F^5$, bearing, respectively, against the top and one side of said shoe, the screw $F^4$ determining the height of the shoe, while the screw $F^5$ holds the shoe firmly against one side of the recess $F^3$. The other shoe $F'$ is free to move laterally in the recess $F^2$, and is secured to the carrier only by a vertical screw $F^6$, which enters a transverse slot extending across the shoe $F'$, the screw $F^6$ simply engaging the shoe with the carrier, so that it will move endwise with the carrier and at the same time will be free to move in a direction at right angles to the movement of the carrier to a slight extent, the width of the recess being considerably greater than that of the shoe, so that the shoe can conform to any twist or deflection in the guide $b$, on which it runs. It will be seen that by engaging only one of the shoes rigidly with the carrier and permitting the other shoe to have a side slip any imperfections in the formation of the guides, resulting in a lack of absolute parallelism, will be compensated for, so that there will be no binding of the shoes upon the guides. By securing each shoe in a recess considerably larger than the shoe, in the manner shown, I am enabled to leave each recess with all its sides but one in a rough condition, it being necessary to plane only one side of each recess to afford a bearing for the shoe therein. The surfaces of the recesses $c^4$ in the periphery of the turret constitute cams which operate the dogs $c^2$, and it is obvious that said cams may be arranged in any other suitable way to accomplish the desired result. The form of the dogs and the construction whereby they are enabled to be controlled by the turret and cams may be variously modified.

It will be observed that the turret or tool-holder shown in the drawings is a substantially flat plate having a flat upper surface, which is so low or is raised so little above the carrier that it is adapted to pass under the work, the operating-tools being above its upper surface. This form is an improvement over turrets heretofore made, which have always been of such height that their upper ends project above the work. Hence the work has to enter holes in the turret, so that the operation cannot be as freely inspected as it can when my improved turret is used.

I call the tool-supporting bracket or body $i$, the cutting-tool $j$, arranged to bear on one side of the work, and the back-rest $k$, arranged to bear on the opposite side of the work, a "box-tool," because said parts comprise a tool which practically incloses the work and can be inclosed to grasp and release the work. The extent of the closing movement of the cutting-tool and bracket is predetermined, so that said parts cannot be misplaced when the lathe is in operation.

I claim—

1. In a lathe, the combination of a work holding and rotating chuck, a turret or tool-support, a tool-holding bracket or standard on said support having an orifice to receive the work that projects from the chuck, a tool-holding device pivoted to the bracket at one side of said orifice and provided with an adjusting-cam bearing on a fixed support on the bracket and adapted to move the tool forward to a predetermined position, and a rest-holder on said bracket at the opposite side of the said opening and provided with a movable latch and a back-rest supported by said holder and latch in a predetermined position and adapted to be removed therefrom, as set forth.

2. The combination, with a lathe-spindle and the pulley and gear loosely mounted thereon, of a sleeve mounted to slide lengthwise on the spindle and rotatively engaged therewith, means for moving said sleeve in either direction upon the spindle, a friction-clutch adapted to be operated by a movement of said sleeve in one direction to connect the pulley with the spindle, and a positive clutch at the other end of said sleeve adapted to be operated by a movement of the sleeve in the opposite direction to connect the gear with the spindle, as set forth.

3. The combination, with a lathe-spindle and the pulley and gear loosely mounted thereon, of the collar or band affixed to the spindle within the pulley, the friction-clutch devices interposed between the said collar and the perimeter of the pulley, the sliding sleeve rotatively engaged with said band or collar and formed at one end to operate the friction-clutch, said sleeve having a positive clutch member at its other end, formed to engage a corresponding clutch member on the gear, and means, substantially as described, for moving said sleeve upon the spindle, and thereby causing it to operate the friction and positive clutches alternately, as set forth.

4. The combination, with the lathe-spindle and the pulley and gear normally loose thereon, of the collar or band affixed to the spindle within the pulley, the friction-clutch devices supported by said collar, the movable sleeve rotatively engaged with the collar and formed at one end to operate the said friction-clutch, the annular plate engaged with said sleeve, the sliding collar on the spindle outside the gear and provided with a flange connected at its margin with said annular plate, said flange constituting a casing covering the gear on the spindle, and the rock-shaft having an arm engaged with the last-mentioned collar, as set forth.

5. The spindle-supporting heads having box-seats at their upper ends to receive and support the spindle-boxes, and hollow posts rigidly secured in sockets formed in said heads and projecting upwardly at opposite sides of said seats, combined with the box-securing caps having sockets to receive the projecting portions of said posts, and bolts passing through said caps and posts into tapped sockets in the heads, as set forth.

6. The spindle-supporting heads formed at their upper portions to hold the spindle-boxes and provided below said boxes with cavities, each of which is dressed or planed on one side to form a seat for a box of the back gear-shaft, combined with boxes for said shaft inserted in said recesses, and set-screws arranged to hold the boxes against said seats, the boxes being vertically adjustable in said recesses and secured by the said screws at any points to which they may be adjusted, whereby the gears on said shaft may be set or adjusted to engage them properly with the gears with which they co-operate, as set forth.

7. In a turret-lathe, the combination, with a carrier, of a rotary turret or tool-holder and a gib securing the said turret to the carrier at or near the margin of the turret, whereby the deflection or lifting of the margin of the turret is prevented, as set forth.

8. In a turret-lathe, the combination of a carrier, a rotary turret or tool-holder, and an annular gib rigidly secured to the carrier and engaged with a groove in the turret at or near the periphery thereof, as set forth.

9. The combination of the carrier, the rotary turret or tool-holder thereon having a series of operating-tools and a corresponding series of index or latch-receiving sockets, the pinion on the turret, the rack on the carrier engaged with said pinion, the stop on the lathe-bed adapted to arrest said rack, the spring-projected latch or index adapted to co-operate with either socket in locking the turret, and the pivoted retracting-lever engaged with said index and provided with a projection arranged to be depressed by a cam on said rack, as set forth.

10. The combination, with the carrier, the turret, the turret-rotating rack, the turret-locking index, and the index-retracting lever, of the spring-detent arranged to arrest the said retracting-lever in its depressed position, and the adjustable knocking-off screws or pins on the turret, as set forth.

11. The combination of the lathe-bed, the carrier, the rotary turret mounted on the carrier and provided with a series of tools, the feed-shaft adapted to engage suitable operating-gearing on the carrier, said shaft being movable and adapted to be separated by gravitation from said gearing, an arm or lever supporting a vertically-movable bearing in which said shaft is journaled, a detent on the carrier, which normally supports said lever with the shaft in its operative position, a series of notched or shouldered bars adjustably secured to the lathe-bed, said bars corresponding in number to the tools on the turret, and devices on the carrier, operated by said bars, whereby the said detent is displaced and caused to release the feed-shaft by the action of the bar corresponding to the tool in operative position, as set forth.

12. The combination of the carrier, the turret having a series of operating-tools, the vertically-movable feed-shaft, the feed-shaft-supporting stud located on the carrier, connections between the said shaft and stud, whereby when the stud is in its normal position said shaft is supported in engagement with the carrier-operating gearing, and automatic means for turning said stud at a predetermined point in the movement of the carrier, and thereby releasing the feed-shaft from engagement with said gearing, as set forth.

13. The combination of the carrier, the turret having a series of operating-tools, the vertically-movable feed-shaft, the feed-shaft-supporting stud located on the carrier, connections between the said shaft and stud, whereby when the stud is in its normal position said shaft is supported in engagement with the carrier-operating gearing, the series of dogs, and the bar engaged therewith, all having a limited endwise movement on the carrier, said bar being engaged, as described, with pins on said stud, a series of stops adjustably secured to the lathe-bed and each adapted to co-operate with one of said dogs in arresting the movement of the series of dogs and the bar connected therewith, whereby said bar is caused to turn the stud to its feed-shaft-releasing position, and means for controlling said dogs, whereby only one is permitted to operate at a time, as set forth.

14. The combination of the turret having a series of operating-tools and a corresponding series of recesses, the surfaces of which constitute cams, the carrier on which said turret is mounted, the series of dogs supported by the carrier and adapted to be operated one at a time by the cam-surfaces of said turret, each dog when in its operative position being adapted to meet a corresponding projection on the bed, as set forth.

15. The combination of the turret, the carrier, the loose pinion at the center of the turret, having ratcheted teeth, the dogs adapted to engage the teeth on the pinion, and means for rotating said pinion, as set forth.

16. The combination of the lathe-bed, the carrier, the rotary turret mounted on the carrier and provided with a series of tools, the feed-shaft adapted to engage suitable operating-gearing on the carrier, said shaft being movable and adapted to be separated by gravitation from said gearing, an arm or lever supporting a vertically-movable bearing in which said shaft is journaled, a rotary stud $u$ on the carrier, which normally supports said lever with the shaft in its operative position, a series of notched or shouldered bars adjustably secured to the lathe-bed, said bars corresponding in number to the tools on the turret, the bar $v^6$, having orifices $v\ v'$, receiving pins $u^3\ u^4$ on said stud, one of said orifices being considerably larger than the pin it receives, a series of dogs engaged with said bar and arranged to co-operate with said bars, each dog having a finger bearing on the periphery of the turret, the dogs and bar having a limited movement on the turret, and a spring whereby the bar is normally forced forward, so that it normally acts on the pins $u^3\ u^4$ to hold the stud $u$ in its shaft-supporting position, as set forth.

17. The lathe-bed having a single downwardly-projecting end bearing located at one end of the bed at a point between the sides of the bed and two downwardly-projecting bearings located at opposite sides of the bed between the single end bearing and the opposite end of the machine, and two supports or legs, one supporting the single end bearing and the other two side bearings, as set forth.

18. The combination of a lathe-bed and two supports or legs therefor, the bed having two pivotal bearings on one of said supports arranged to firmly hold the bed laterally and to permit it to tip lengthwise, and a single pivotal bearing on the other support arranged to permit the bed to tip crosswise, as set forth.

19. The combination of the bed having guides $b\ b$, the carrier having recesses over said guides, and the guide-engaging shoes located in said recesses, one of said shoes being rigidly secured to the carrier, while the other is adapted to slip sidewise thereon, as set forth.

20. The combination of the bed having guides $b$ $b$, the carrier having recesses over said guides, the shoe F, adjustably fixed in one of said recesses by screws $F^4$ $F^5$, and the laterally-movable shoe in the other recess, having a slot receiving a guiding-screw $F^6$ on the carrier, as set forth.

21. The combination, with the carrier having the projecting rack-bar, of the stop consisting of the holder D, affixed to the bed, and the plunger $p'$, movable in said holder and confining a body or cushion of air therein, as set forth.

22. In a lathe, the combination of a chuck-carrying spindle mounted in fixed bearings, a carrier movable to and from the chuck on the bed of the lathe, and a revolving tool-holder mounted on said carrier and adapted to rotate therein, said holder having a flat upper surface and being adapted to support a series of tools above said surface, as set forth.

23. In a lathe, the combination of a chuck-carrying spindle mounted in fixed bearings, a carrier movable to and from the chuck, and a turn-table tool-holder or turret mounted thereon and adapted to pass under the work, said tool-holder being also adapted to receive tools on its upper surface, as set forth.

24. In a lathe, a plate-shaped revolving tool-holder mounted on a carriage or carrier, as set forth.

25. In a lathe, the combination of a tool-carriage, a carrier, and a plate-shaped tool-holder or turret pivoted at its center to the carrier and adapted to have a series of tools affixed to its face, as set forth.

26. In a lathe, the combination of a chuck-carrying spindle mounted in fixed bearings, a carrier movable toward and from the chuck on the bed of the lathe, a tool-holder or turret mounted on said carrier, and an opening and closing box-tool, said box consisting of a body or bracket $i$, to which are affixed a cutting-tool $j$ and a back-rest $k$, as set forth.

27. In a lathe, the combination of a chuck-carrying spindle mounted in fixed bearings, a carrier movable to and from the chuck on the bed of the lathe, a tool-holder mounted on said carriage, and a box-tool affixed to said tool-holder, said box-tool having a cutting-tool and a back-rest arranged to bear on opposite sides of the stock being operated upon and adapted to be readily separated and to close to a predetermined position, the said back-rest following the tool and bearing on the surface produced by the tool and all adapted to travel from the chuck in cutting, as set forth.

28. In a turret-lathe, the combination of a carrier, a turret or tool-holder mounted to rotate on said carriage, a series of fixed stop members on the bed of the lathe, said members corresponding in number to the number of tools which the turret carries or is adapted to carry, a corresponding series of movable stop members on the carrier, and means for holding each movable stop member out of its operative position, excepting when the tool corresponding to said member is in position to operate, as set forth.

29. The combination, in a lathe-head, of a pulley and gear mounted on the spindle, a sliding sleeve between said pulley and gear, a drum inclosing said gear and fitting in an annular groove in said sleeve, and a lever connected to said drum, for the purpose set forth.

30. In a box or journal of a lathe-head, a hollow post driven firmly into the main casting, onto which the cap of said box is fitted, as set forth.

31. In a lathe-head, a spindle-box cap fitted to hollow posts, said posts being partly driven into the main castings and projecting upwardly to engage said cap, as set forth.

32. In a lathe-head, the combination of a rotary spindle, boxes therefor, box-holding caps, a main casting or standard supporting said boxes and caps and provided with hollow posts driven firmly into sockets in the main castings and engaged with the cap, said caps being held against lateral strain by said posts and against vertical thrust by bolts, which pass through the hollow posts and are screw-threaded into the main casting, all combined substantially as set forth.

33. In a lathe, a multiple-tool holding and carrying device consisting of a sliding carriage and a revolving turn-table or tool-holder provided with means for affixing tools to the face of said holder, as set forth.

34. In a lathe, the combination, with a tool carrier or carriage, of a dash-pot stop for arresting the motion of the tool-carriage, as set forth.

35. In a lathe, the combination, with a tool-carriage having a projecting stud, of a stop affixed to the bed, said stop containing an air-chamber adapted to co-operate with said stud, for the purpose set forth.

In testimony whereof I have signed my name to this specification, in the presence of two subscribing witnesses, this 20th day of December, A. D. 1890.

JAMES HARTNESS.

Witnesses:
C. G. RICHARDSON,
W. D. WOOLSON.